(12) United States Patent
Ouyang (10) Patent No.: US 11,523,638 B2
(45) Date of Patent: Dec. 13, 2022

(54) POWER ASSEMBLY AND ELECTRONIC CIGARETTE HAVING SAME

(71) Applicant: SHENZHEN IVPS TECHNOLOGY CO., LTD., Shenzhen (CN)

(72) Inventor: Junwei Ouyang, Shenzhen (CN)

(73) Assignee: SHENZHEN IVPS TECHNOLOGY CO., LTD., Shenzhen (CN)

( * ) Notice: Subject to any disclaimer, the term of this patent is extended or adjusted under 35 U.S.C. 154(b) by 658 days.

(21) Appl. No.: 16/503,646

(22) Filed: Jul. 5, 2019

(65) Prior Publication Data
US 2020/0008479 A1    Jan. 9, 2020

(30) Foreign Application Priority Data
Jul. 5, 2018    (CN) .......................... 201810729059.2

(51) Int. Cl.
| | | |
|---|---|---|
| *A24F 40/51* | (2020.01) | |
| *A24F 40/40* | (2020.01) | |
| *G01L 9/00* | (2006.01) | |
| *H05B 1/02* | (2006.01) | |
| *A24F 40/485* | (2020.01) | |
| *A24F 40/10* | (2020.01) | |

(52) U.S. Cl.
CPC .............. *A24F 40/51* (2020.01); *A24F 40/40* (2020.01); *A24F 40/485* (2020.01); *G01L 9/0041* (2013.01); *H05B 1/0297* (2013.01); *A24F 40/10* (2020.01)

(58) Field of Classification Search
CPC ....... A24F 40/51; A24F 40/40; H05B 1/0297; G01L 9/0041
See application file for complete search history.

(56) References Cited

U.S. PATENT DOCUMENTS

| | | | | |
|---|---|---|---|---|
| 11,064,740 B2* | 7/2021 | Ouyang | ............... | H05B 1/0297 |
| 2011/0265806 A1* | 11/2011 | Alarcon | .................. | A24F 40/50 |
| | | | | 131/273 |
| 2016/0073692 A1* | 3/2016 | Alarcon | ................. | A24F 40/40 |
| | | | | 131/329 |
| 2020/0008466 A1* | 1/2020 | Ouyang | ................. | A24F 40/51 |

FOREIGN PATENT DOCUMENTS

| | | |
|---|---|---|
| CN | 107890142 A | 4/2018 |
| CN | 108078015 A | 5/2018 |

* cited by examiner

*Primary Examiner* — Hae Moon Hyeon
(74) *Attorney, Agent, or Firm* — IP-PAL Patent US; Klaus Michael Schmid (57) ABSTRACT

The present invention discloses a power assembly and an electronic cigarette having same. The power assembly comprises a main body, a waterproof and breathable membrane and a pneumatic sensor, wherein the main body is provided with an internal cavity in which the pneumatic sensor is mounted and a mounting portion in which an external load is mounted, the mounting portion is provided with an airflow passage, the internal cavity is in communication with external environment through the airflow passage, the waterproof and breathable membrane is mounted on the main body and covers the airflow passage; when the external load is mounted on the mounting portion, the air channel inside the external load is communicated with the airflow passage, and when the pneumatic sensor senses that the airflow movement in the airflow passage reaches a preset threshold, the main body is triggered to control the external load.

15 Claims, 5 Drawing Sheets

POWER ASSEMBLY AND ELECTRONIC CIGARETTE HAVING SAME

TECHNICAL FIELD

The present invention relates to a power assembly and an electronic cigarette having same.

BACKGROUND

With the gradual development of the electronic cigarette industry, small electronic cigarettes are more and more popular among consumers. In order to reduce the volume of the product, a sensor is usually used to sense the smoke of a user to trigger, so that the electronic cigarette atomizes the stored tobacco liquid into smoke for the user to smoke.

However, the sensor needs to be communicated with the air channel through which the electronic cigarette is suctioned to be triggered when the user smokes. During the long-term smoking process, the condensed water generated during the atomization process of the stored tobacco liquid will be accumulated in the electronic cigarette cavity, and the surface of the electronic cigarette sensor is usually provided with a dust cloth, which is easy to adsorb tobacco liquid and condensed water, resulting in a reduced sensitivity and even a phenomenon of short-circuit damage.

SUMMARY

The main object of the present invention is to provide an electronic cigarette, which is intended to avoid damage to a pneumatic sensor caused by the penetration of tobacco liquid and condensed water.

In order to achieve the above object, the present invention provides a power assembly, comprising: a main body, a waterproof and breathable membrane and a pneumatic sensor, wherein the main body is provided with an internal cavity in which the pneumatic sensor is mounted and a mounting portion in which an external load is mounted, the mounting portion is provided with an airflow passage, the internal cavity is in communication with external environment through the airflow passage, the waterproof and breathable membrane is mounted on the main body and covers the airflow passage; when the external load is mounted on the mounting portion, the air channel inside the external load is communicated with the airflow passage, and when the pneumatic sensor senses that the airflow movement in the airflow passage reaches a preset threshold, the main body is triggered to control the external load.

Preferably, the waterproof and breathable membrane is mounted to an end of the airflow passage away from the internal cavity.

Preferably, the main body is provided with a mounting groove in which the waterproof and breathable membrane is mounted, and the waterproof and breathable membrane has a thickness value H greater than or equal to the depth value h of the mounting groove such that when the waterproof and breathable membrane is mounted to the mounting groove, the waterproof and breathable membrane is exposed to an external surface, which is level with the notch plane of the mounting groove or higher than the notch plane of the mounting groove.

Preferably, the waterproof and breathable membrane comprises a substrate having a waterproof and breathable property and an anti-wrinkle ring, wherein the anti-wrinkle ring covers the edge of the substrate such that when the substrate is mounted to the main body, the portion of the substrate that is not covered by the anti-wrinkle ring covers the airflow passage and forms a breathable portion, and the breathable portion is communicated with the airflow passage through an air channel.

Preferably, the waterproof and breathable membrane further comprises an adhesive layer, the adhesive layer is provided on the surface of the substrate away from the anti-wrinkle ring so that the substrate is adhered to the main body, and the adhesive layer is provided to avoid the breathable portion of the substrate; and/or, the substrate has a thickness value of 0.02 mm to 0.11 mm.

Preferably, the main body comprises a housing, a frame and a sealing member; one end of the frame is provided with the mounting portion, and the other end and the housing encircles a receiving space for receiving electronic components; the sealing member comprises a cover portion and an air guiding portion connected to the cover portion, the cover portion is mounted in the receiving space and is provided with the internal cavity, and the air guiding portion is engaged in the airflow passage to communicate the airflow passage with the internal cavity.

Preferably, the air guiding portion is provided with at least one air vent, and an outer circumferential surface of the air guiding portion is abutted against the inner circumferential surface of the airflow passage such that the airflow moves from the internal cavity and the airflow passage only through the through the air vent.

Preferably, the frame is provided with a mounting pocket with an opening to form the mounting portion, the inner wall of the mounting pocket is provided with a through hole communicated with the receiving space to form the airflow passage, and the external load is engaged into the mounting pocket and is spaced apart from the inner wall of the mounting pocket to form an air inlet passage, through which the outside is communicated with the airflow passage.

Preferably, the main body further comprises an electrode assembly, the electrode assembly comprises an insulated mounting plate and at least two output electrodes, the two output electrodes pass through the mounting plate at intervals, the mounting pocket is provided with an groove and at least two avoiding holes, the mounting plate is fixedly mounted in the groove, the mounting plate is further convexly provided with a protective edge corresponding to each of the output electrodes, the protective edge covers a portion of the outer surface of the output electrodes such that when the output electrodes pass through the avoiding hole, the output electrodes are spaced apart from an inner hole wall of the avoiding hole, and when the external load is mounted in the mounting pocket, the output electrodes are electrically communicated with the external load and the main body.

The present invention further provides an electronic cigarette comprising an external load and a power assembly, wherein the external load is a heating device in which tobacco liquid or a tobacco product is stored. The power assembly comprises: a main body, a waterproof and breathable membrane and a pneumatic sensor. The main body is provided with an internal cavity in which the pneumatic sensor is mounted and a mounting portion in which an external load is mounted, the mounting portion is provided with an airflow passage, the outside is communicated with the internal cavity through the airflow passage, the waterproof and breathable membrane is mounted on the main body and covers the airflow passage; when the external load is mounted on the mounting portion, the air channel inside the external load is communicated with the airflow passage, and when the pneumatic sensor senses that the airflow movement in the airflow passage reaches a preset threshold, the main body is triggered to control the external load.

The power assembly of the technical solution of the present invention is provided with a waterproof and breathable membrane covering the airflow passage, the air channel inside the external load and the airflow passage are still connected to each other, thereby effectively preventing the tobacco liquid and the condensed water generated in the use process from penetrating into the internal cavity through the airflow passage so as to damage the pneumatic sensor. At the same time, it does not affect the induction performance of the original pneumatic sensor, and does not need to be customized with a waterproof pneumatic sensor, which effectively saves the using cost. When the tobacco liquid and the condensed water are concentrated more and the suction sensitivity is lowered, the sensitivity of the pneumatic sensor can be restored by simply shaking the power assembly to separate the tobacco liquid and the condensed water from the waterproof and breathable membrane.

BRIEF DESCRIPTION OF THE DRAWINGS

For a better illustration of the embodiments of the present invention or the technical solution in the prior art, accompanying drawings needed in the description of the embodiments or the prior art are simply illustrated below. Obviously, the accompanying drawings described below are some embodiments of the present invention. For those skilled in the art, other accompanying drawings may be obtained according to the structure shown in these accompanying drawings without creative work.

DESCRIPTION OF THE REFERENCE NUMBERS

| Reference number | Name of part | Reference number | Name of part |
| --- | --- | --- | --- |
| 100 | power assembly | 1321 | air vent |
| 10 | main body | 14 | receiving space |
| 11 | housing | 15 | electrode assembly |
| 12 | frame | 151 | mounting plate |
| 121 | mounting portion | 1511 | protective edge |
| 121' | mounting pocket | 152 | output electrode |
| 1211 | airflow passage | 30 | waterproof and breathable membrane |
| 1212 | intake aisle | 31 | substrate |
| 122 | mounting groove | 311 | breathable portion |
| 1221 | notch plane | 32 | anti-wrinkle ring |
| 13 | sealing member | 33 | adhesive layer |
| 131 | cover portion | 50 | pneumatic sensor |
| 1311 | internal cavity | 200 | heating device |
| 132 | air guiding portion | 1000 | electronic cigarette |

The implementation of aims, the function features and the advantages of the present disclosure are described below in further detail in conjunction with embodiments with reference to the drawings.

DESCRIPTION OF THE EMBODIMENTS

A clear and complete description as below is provided for the technical solution in the embodiments of the present invention in conjunction with the drawings in the embodiments of the present invention. Obviously, the embodiments described hereafter are simply part embodiments of the present invention, rather than all the embodiments. All other embodiments obtained by those skilled in the art based on the embodiments in the present invention without creative work are intended to be included in the scope of protection of the present invention.

It should be noted that all directional indications (such as top, bottom, left, right, front, behind . . . ) in the embodiments of the present invention are merely to illustrate a relative position relation, a relative motion condition, etc. between each part in a certain state (for example, the state shown in the drawings). If the state changes, the directional indication changes accordingly.

In addition, if terms "first", "second", etc. appear in the present invention, they are merely for the purpose of description, but cannot be understood as the indication or implication of relative importance or as the implicit indication of the number of the designated technical features; therefore, features defined by "first" and "second" may specifically or implicitly comprise at least one such feature. In addition, technical solutions of each embodiment of the present invention may be combined mutually; however, this must be carried out on the basis that those skilled in the art can implement the combination. When the combination of technical solutions has a conflict or cannot be implemented, it should be considered that such combination of technical solutions does not exist and is not in the scope of protection claimed by the present invention.

In the present invention, unless otherwise specifically stated and defined, terms "connected", "fixed", etc. should be interpreted expansively. For example, "fixed" may be fixed connection, detachable connection, or integration; may be mechanical connection or electrical connection; direct connection, indirect connection through an intermediate, or internal communication between two elements or interaction of two elements, unless otherwise specifically defined. Those skilled in the art can understand the specific implication of the above terms in the present invention according to specific conditions.

The present invention provides a power assembly 100 for powering an external load under the trigger of the pneumatic sensor 50. Here, in the present embodiment, the external load is taken as the heating device 200 as an example. The power assembly 100 is combined with the heating device 200 to form an electronic cigarette 1000. The heating device 200 is internally provided with a storage space in which tobacco liquid or a tobacco product is stored and a heat generating component. When the pneumatic sensor 50 is triggered, the power assembly 100 is driven to supply power to the heating device 200, so that the heat generating component heats the tobacco liquid or tobacco product stored internally, thereby generating smoke for the user to suction. Here, in the present embodiment, the heating device 200 is taken as an atomizer for storing the tobacco liquid as an example. The atomizer is provided with an air inlet and an air outlet, and an atomizing air channel is formed between the air inlet and the air outlet. A heat generating component for heating the tobacco liquid is provided in the atomizing air channel.

Referring to FIG. 1 to FIG. 6, the power assembly 100 comprises a main body 10, a waterproof and breathable membrane 30, and a pneumatic sensor 50, wherein the main body 10 is provided with an internal cavity 1311 in which the pneumatic sensor 50 is mounted and a mounting portion 121 in which an external atomizer is mounted, the mounting portion 121 is provided with an airflow passage 1211, the internal cavity 1311 is in communication with external environment through the airflow passage 1211, the waterproof and breathable membrane 30 is mounted on the main body 10 and covers the airflow passage 1211; when the atomizer is mounted on the mounting portion 121, the air channel inside the atomizer is communicated with the airflow passage 1211, and when the pneumatic sensor 50 senses that the airflow movement in the airflow passage 1211 reaches a preset threshold, the main body 10 is triggered to control the atomizer.

The power assembly 100 of the technical solution of the present invention is provided with a waterproof and breathable membrane 30 covering the airflow passage 1211, the air channel inside the external atomizer and the airflow passage 1211 are still connected to each other, thereby effectively preventing the tobacco liquid and the condensed water generated in the use process from penetrating into the internal cavity 1311 through the airflow passage 1211 so as to damage the pneumatic sensor 50. At the same time, it does not affect the induction performance of the original pneumatic sensor 50, and does not need to be customized with a waterproof pneumatic sensor 50, which effectively saves the using cost. When the tobacco liquid and the condensed water are concentrated more and the suction sensitivity is lowered, the sensitivity of the pneumatic sensor 50 can be restored by simply shaking the power assembly 100 to separate the tobacco liquid and the condensed water from the waterproof and breathable membrane 30.

Here, in the present embodiment, the pneumatic sensor 50 is a negative pressure sensor. When the user smokes, the air in the internal cavity 1311 is extracted from the airflow passage 1211, thereby generating an air pressure difference. When the generated air pressure difference reaches a preset threshold, the negative pressure sensor is triggered so that the main body 10 supplies power to the atomizer.

It can be understood that, in the actual application process, it is not limited to the above method of triggering power supply using the negative pressure sensor. For example, in another embodiment of the present invention, the manner, in which the pneumatic sensor 50 can be formed by a combination of a trigger diaphragm and an electrode plate, when the user smokes, the airflow in the internal cavity 1311 flows out through the airflow passage 1211, thereby causing the trigger diaphragm to vibrate, and when the trigger diaphragm vibrates to be in contact with the electrode plate, the trigger diaphragm is electrically communicated with the electrode plate so as to trigger the main body 10 to supply power to the atomizer, is also within the scope of protection of the present invention.

Figure 1:
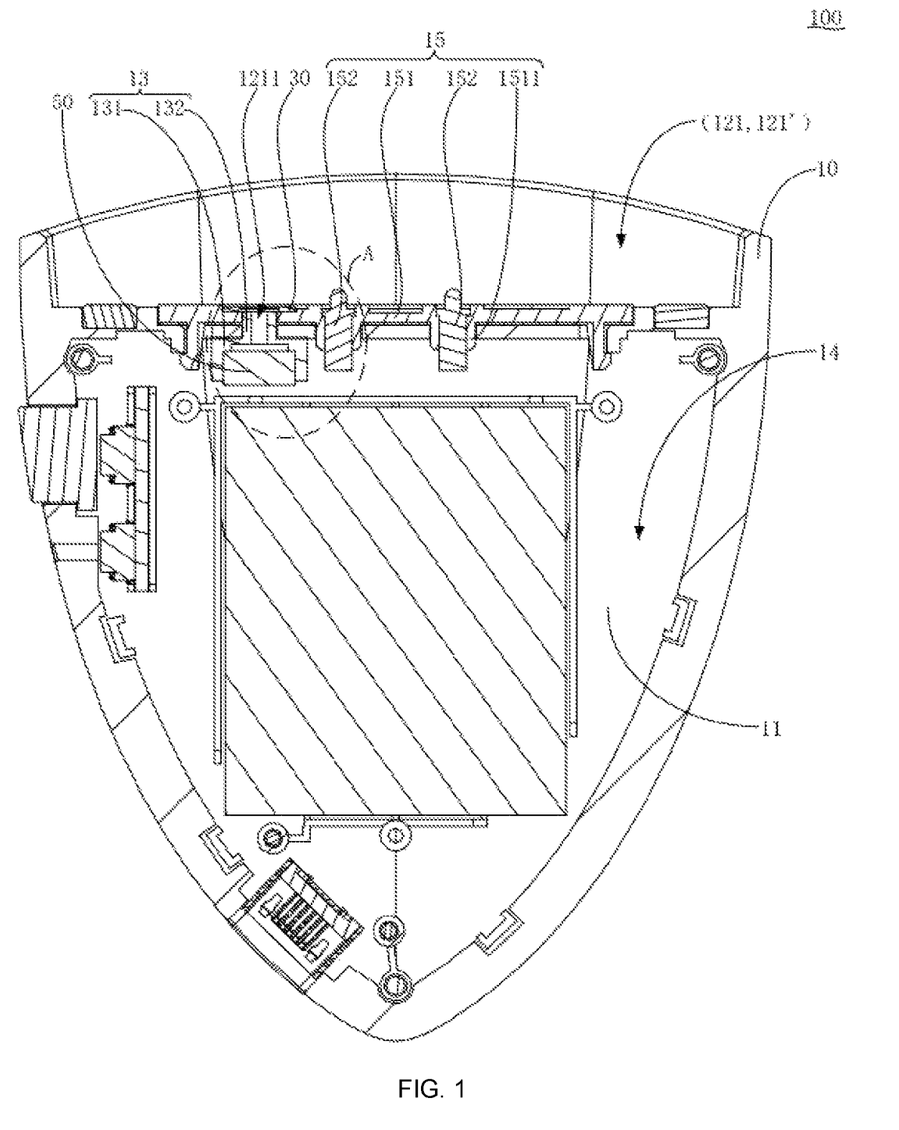
FIG. 1 is an exploded schematic diagram illustrating a connecting structure of a power assembly according to the present invention.
Figure 2:
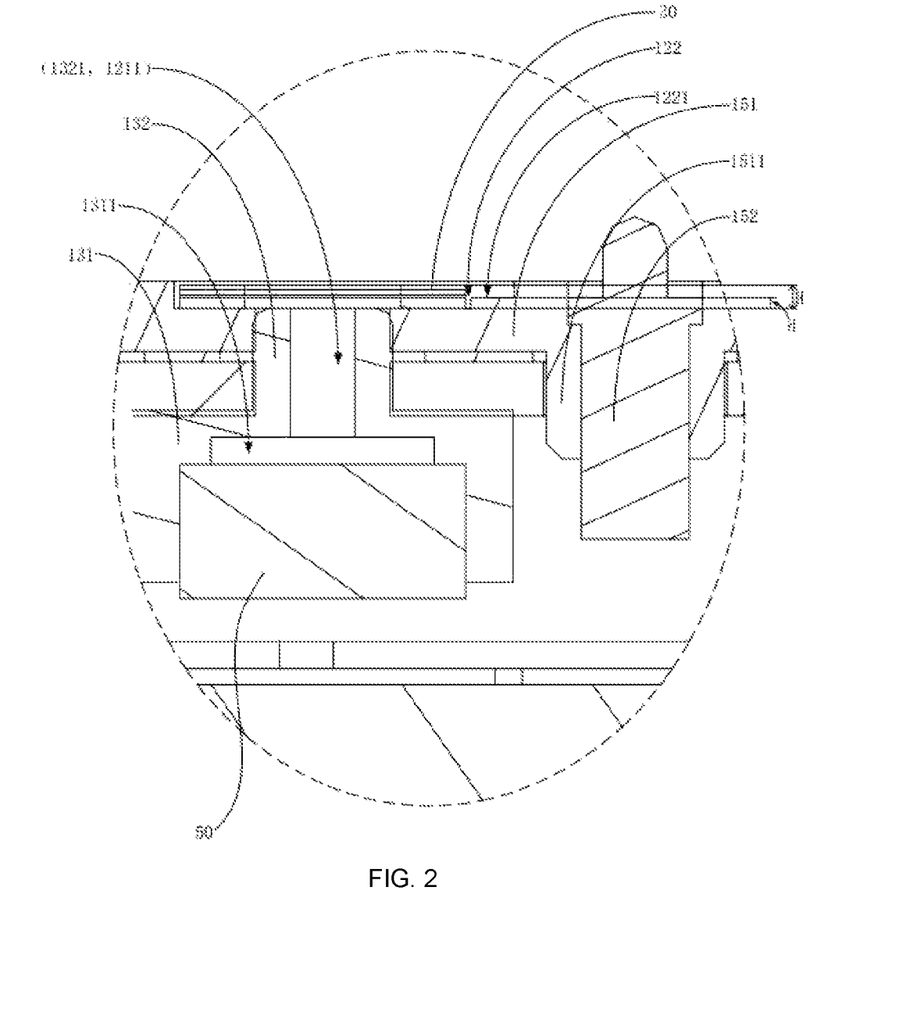
FIG. 2 is a partially enlarged schematic diagram at A of FIG. 1 according to the present invention.

Specifically, as shown in FIG. 1 or FIG. 2, in the embodiment of the present invention, the waterproof and breathable membrane 30 is mounted to an end of the airflow passage 1211 away from the internal cavity 1311. Here, in the present embodiment, the waterproof and breathable membrane 30 covers the end of the airflow passage 1211 away from the end of the internal cavity 1311, effectively preventing the phenomenon that tobacco liquid or condensed water penetrates into the airflow passage 1211 so that it is difficult to discharge.

It can be understood that, in the actual application process, the waterproof and breathable membrane 30 is not limited to being mounted at the end of the airflow passage 1211 away from the end of the internal cavity 1311. For example, in another embodiment of the present invention, the manner, in which the waterproof and breathable membrane 30 may also be provided on the surface of the pneumatic sensor 50; or, provided in the airflow passage 1211, and then provided with a drainage channel communicated with the airflow passage 1211 so as to discharge the tobacco liquid gathered in the airflow passage 1211, is within the scope of protection of the present invention.

Figure 3:
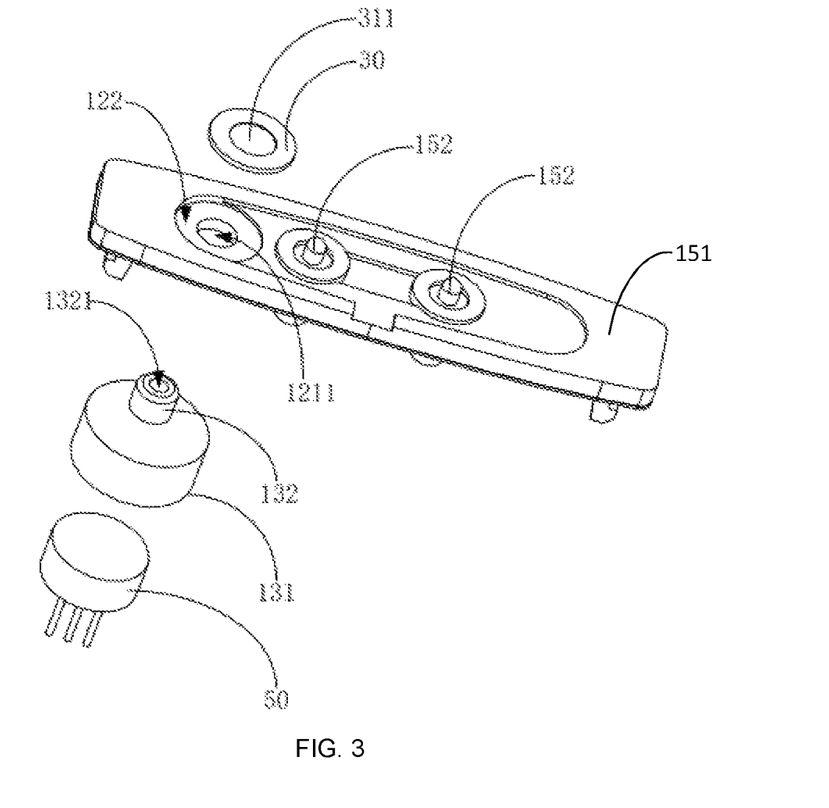
FIG. 3 is an exploded schematic diagram illustrating a connecting structure of a waterproof and breathable membrane mounted on a main electrode assembly according to the present invention.

Specifically, as shown in FIG. 2 and FIG. 3, in the embodiment of the present invention, the main body 10 is provided with a mounting groove 122 in which the waterproof and breathable membrane 30 is mounted, and the waterproof and breathable membrane 30 has a thickness value H greater than or equal to the depth value h of the mounting groove 122 such that when the waterproof and breathable membrane 30 is mounted to the mounting groove 122, the waterproof and breathable membrane 30 is exposed to an external surface, which is level (i.e., flush) with the notch plane 1221 of the mounting groove 122 or higher than the notch plane 1221 of the mounting groove 122. Here, in the present embodiment, the main body 10 is provided with a mounting groove 122, the airflow passage 1211 is provided in the mounting groove 122, the waterproof and breathable membrane 30 covers the airflow passage 1211 when being mounted on the mounting groove 122, and the outer circumferential surface of the waterproof and breathable membrane 30 is abutted against the inner groove wall of the mounting groove 122, efficiently facilitating positioning and mounting, and preventing the tobacco liquid and the condensed water from being deposited in the mounting groove 122. In addition, the waterproof and breathable membrane 30 has a thickness value H greater than or equal to the depth value h of the mounting groove 122 such that when the waterproof and breathable membrane 30 is mounted in the mounting groove 122, one end of the waterproof and breathable membrane 30 away from the airflow passage 1211 is higher than the notch plane 1221 of the mounting groove 122, further effectively preventing the phenomenon that the tobacco liquid and the condensed water are accumulated in the mounting groove 122 to cover the surface of the waterproof and breathable membrane 30 so that the trigger sensitivity is lowered; the waterproof and breathable membrane 30 is higher than or level with the notch plane 1221 of the mounting groove 122. When the waterproof and breathable membrane 30 accumulates more tobacco liquid and condensed water, it is only necessary to shake the power assembly 100 to separate the tobacco liquid from the surface of the waterproof and breathable membrane 30. When cleaning, it is only necessary to adsorb the tobacco liquid on the surface of the waterproof and breathable membrane 30 using a cotton swab, it is not necessary to insert the cotton swab into the mounting groove 122 for adsorption, and it is convenient to clean, effectively preventing the phenomenon that the force is excessively inserted into the mounting groove 122 so as to damage the waterproof and breathable membrane 30.

It can be understood that, in the actual application process, it is not limited to the manner in which the waterproof and breathable membrane 30 is higher than the notch plane 1221 of the mounting groove 122 to prevent the tobacco liquid from accumulating on the surface of the waterproof and breathable membrane 30. For example, in another embodiment of the present invention, the manner, in which the waterproof and breathable membrane 30 can also be formed into a curved surface covering the airflow passage 1211, so that the tobacco liquid and the condensed water on the surface of the waterproof and breathable membrane 30 slide down along the curved surface to avoid affecting the trigger sensitivity, is also within the scope of protection of the present invention.

Figure 4:
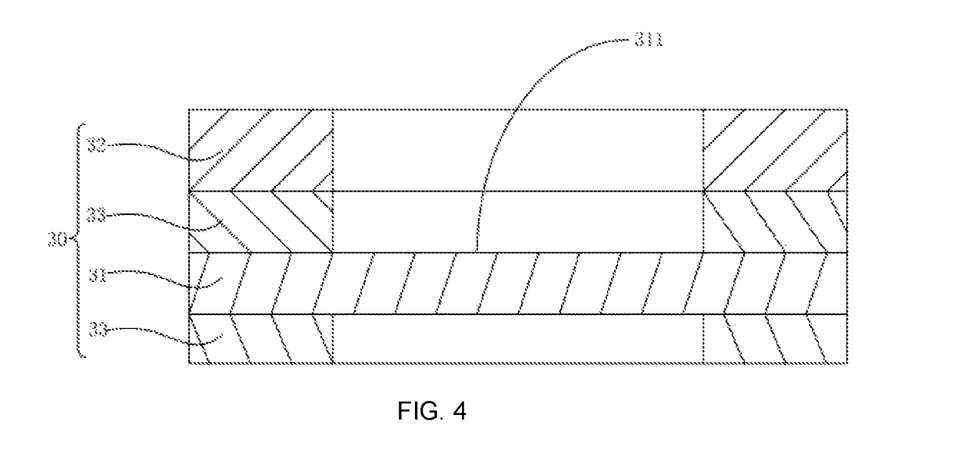
FIG. 4 is a cross-sectional schematic diagram illustrating a connecting structure of a waterproof and breathable membrane according to the present invention.

Specifically, as shown in FIG. 4, in the embodiment of the present invention, the waterproof and breathable membrane 30 comprises a substrate 31 having a waterproof and breathable property and an anti-wrinkle ring 32, wherein the anti-wrinkle ring 32 covers the edge of the substrate 31 such that when the substrate 31 is mounted to the main body 10, the portion of the substrate 31 that is not covered by the anti-wrinkle ring 32 covers the airflow passage 1211 and forms a breathable portion 311, and the breathable portion 311 is communicated with the airflow passage 1211 through an air channel. Here, in the present embodiment, the substrate 31 is formed by hot-melting a high-performance composite material, such as a thermoplastic polyurethane (TPU) waterproof and breathable membrane 30, an expanded polytetrafluoroethylene (EPTFE) composite fabric, etc. The better waterproof and breathable property enables water vapor to pass freely, and at the same time, the condensed water dew is prevented from being penetrated into the internal cavity 1311 along the airflow passage 1211, thereby causing damage to the pneumatic sensor 50; at the same time, in order to ensure better breathable property, the thickness of the substrate 31 is preferably in the range of 0.02 mm to 0.11 mm, and is more preferably 0.06 mm in the present embodiment. Further, in order to prevent the substrate 31 from deforming and wrinkling during the movement of airflow, in the present embodiment, a hard anti-wrinkle ring 32 is covered on the edge of the substrate 31. The anti-wrinkle ring 32 may be selected from polymeric materials such as polyethylene terephthalate, polyethylene plastics, polypropylene plastics, fluoroplastics, polyvinyl chloride, and polyperfluoroethylene propylene. In the present embodiment, the anti-wrinkle ring 32 is prepared using polyethylene terephthalate, and is fixed to the substrate 31 by gluing, so that the substrate 31 has a certain tension to avoid wrinkles. At the same time, the substrate 31 not covered by the anti-wrinkle ring 32 forms a breathable portion 311 through which the air in the airflow passage 1211 flows out.

Specifically, as shown in FIG. 4, in the embodiment of the present invention, the waterproof and breathable membrane 30 further comprises an adhesive layer 33, the adhesive layer 33 is provided on the surface of the substrate 31 away from the anti-wrinkle ring 32 so that the substrate 31 is adhered to the main body 10, and the adhesive layer 33 is provided to avoid the breathable portion 311 of the substrate 31. Here, in the present embodiment, the adhesive layer 33 is provided on the surface of the substrate 31 away from the anti-wrinkle ring 32. When the substrate 31 is adhered to the mounting groove 122, the anti-wrinkle ring 32 protrudes from the outside, effectively preventing the phenomenon of abrasion and breakage of the substrate 31.

It can be understood that, in the actual application process, the adhesive layer 33 is not limited to being provided on the surface of the substrate 31 far away from the anti-wrinkle ring 32 as described above. For example, the manner, in which the adhesive layer 33 may be also provided on the outer surface of the main body 10 or provided on the surface of the anti-wrinkle ring 32 away from the substrate 31, and then the anti-wrinkle ring 32 is bonded to the main body 10, so as to fix the substrate 31 to the main body 10, is within the scope of protection of the present invention.

Preferably, as shown in FIG. 1, in the embodiment of the present invention, the main body 10 comprises a housing 11, a frame 12 and a sealing member 13; one end of the frame 12 is provided with the mounting portion 121, and the other end and the housing 11 encircles a receiving space 14 for receiving electronic components; the sealing member 13 comprises a cover portion 131 and an air guiding portion 132 connected to the cover portion 131, the cover portion 131 is mounted in the receiving space 14 and is provided with the internal cavity 1311, and the air guiding portion 132 is engaged into the airflow passage 1211 to communicate the airflow passage 1211 with the internal cavity 1311. Here, in the present embodiment, the cover portion 131 and the air guiding portion 132 are integrally formed of an elastic silicone material to form the sealing member 13, the pneumatic sensor 50 is mounted in the internal cavity 1311, the outer circumferential surface of the pneumatic sensor 50 is abutted against the inner circumferential surface of the internal cavity 1311 such that a cavity of a smaller volume is formed in the internal cavity 1311, and the cavity is communicated with the air guiding portion 132. Then, the air guiding portion 132 is engaged in the airflow passage 1211 to communicate the airflow passage 1211 with the internal cavity 1311. When the user smokes, the airflow in the internal cavity 1311 is extracted through the air guiding portion 132, which facilitates the formation of the air pressure difference and effectively improves the sensitivity of the pneumatic sensor 50.

Figure 5:
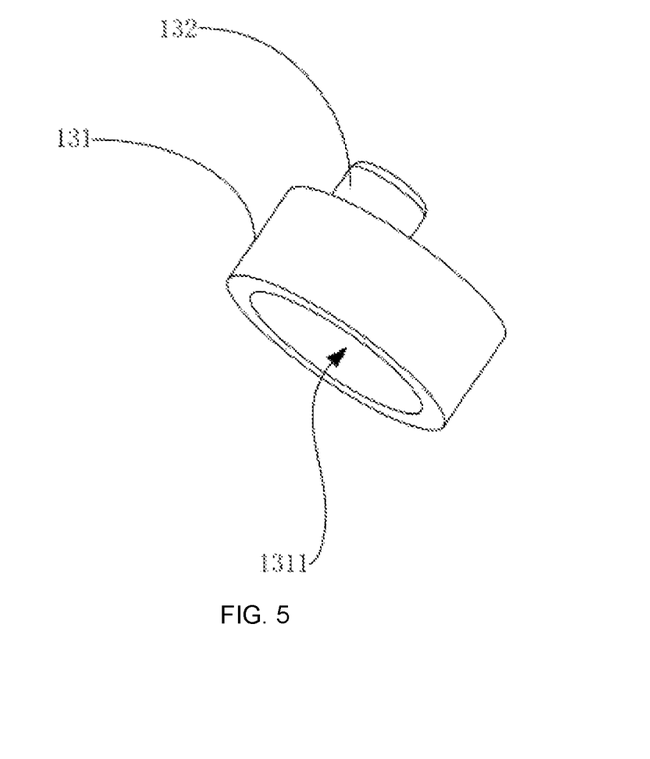
FIG. 5 is a perspective diagram illustrating a connecting structure of a sealing member according to the present invention.

Specifically, as shown in FIG. 3 and FIG. 5, in the embodiment of the present invention, the air guiding portion 132 is provided with at least one air vent 1321, and an outer circumferential surface of the air guiding portion 132 is abutted against the inner circumferential surface of the airflow passage 1211 such that the airflow moves from the internal cavity 1311 and the airflow passage 1211 only through the through the air vent 1321. Here, in the present embodiment, the outer circumferential surface of the air guiding portion 132 is abutted against the inner circumferential surface of the airflow passage 1211 such that the airflow flows from the internal cavity 1311 and the airflow passage 1211 only through the air vent 1321, effectively preventing a gap from being formed between the air guiding portion 132 and the airflow passage 1211 to be communicated with the receiving space 14 inside the main body 10, that is, preventing the phenomenon that when the user smokes, the air in the receiving space 14 flows into the airflow passage 1211 through the gap, so that the flow rate of air flowing into the airflow passage 1211 from the cavity is reduced, and the pneumatic sensor 50 cannot be triggered, further improving the trigger sensitivity of the pneumatic sensor 50.

Specifically, as shown in FIG. 1, in the embodiment of the present invention, the frame 12 is provided with a mounting pocket 121' with an opening to form the mounting portion 121, the inner wall of the mounting pocket 121' is provided with a through hole communicated with the receiving space 14 to form the airflow passage 1211, and the external atomizer is engaged in the mounting pocket 121' and is spaced apart from the inner wall of the mounting pocket 121' to form an air inlet passage, through which the airflow passage 1211 is in communication with the external environment. Here, in the present embodiment, one end of the frame 12 is provided with a mounting pocket 121' with an opening, the surface of the mounting pocket 121' facing the air inlet of the atomizer is provided with a through hole, and the through hole is communicated with the internal cavity 1311 to form the airflow passage 1211. When the external atomizer is engaged in the mounting pocket 121', a portion of the inner wall of the mounting pocket 121' is spaced apart from the outer circumferential surface of the atomizer to form an intake aisle. When the user smokes, the external airflow flows into the air inlet through the intake aisle to provide airflow for the normal operation of the atomizer. At the same time, the airflow passage 1211 is provided on the surface adjacent to the air inlet to ensure that the airflow in the internal cavity 1311 can be preferentially and quickly extracted when the user smokes, thereby generating an air pressure difference to trigger the pneumatic sensor 50, further improving the sensitivity of the pneumatic sensor 50.

Further, as shown in FIG. 1 and FIG. 3, in the embodiment of the present invention, the main body 10 further comprises an electrode assembly 15, the electrode assembly 15 comprises an insulated mounting plate 151 and at least two output electrodes 152, the two output electrodes 152 pass through the mounting plate 151 at intervals, the mounting pocket 121' is provided with an groove and at least two avoiding holes, the mounting plate 151 is fixedly mounted in the groove, the mounting plate 151 is further convexly provided with a protective edge 1511 corresponding to each of the output electrodes 152, the protective edge 1511 covers a portion of the outer surface of the output electrodes 152 such that when the output electrodes 152 pass through the avoiding hole, the output electrodes 152 are spaced apart from an inner hole wall of the avoiding hole, and when the external atomizer is mounted in the mounting pocket 121', the output electrodes 152 are electrically communicated with the atomizer and the main body 10. Here, in the present embodiment, the electrode assembly 15 comprises a positive output electrode 152 and a negative output electrode 152; the frame 12 is made of a metal material, and the mounting plate 151 is made of an insulating plastic material, and the frame 12 made of a metal material has a high connection strength, effectively enhancing the service life. The output positive electrode and the output negative electrode are mounted on the mounting plate 151 in an interference fit manner, the protective edge 1511 envelops a portion of the outer surface of the electrode assembly 15; then the mounting plate 151 is mounted on the mounting groove 122 in an interference fit manner, the protective edge 1511 is interference-fit with the inner hole wall of the avoiding hole, thereby effectively preventing the oil from penetrating into the receiving space 14 inside the main body 10 to damage the internal electronic components. At the same time, the phenomenon that the electrode assembly 15 is directly in contact with the frame 12 to result in a short circuit is prevented.

Figure 6:
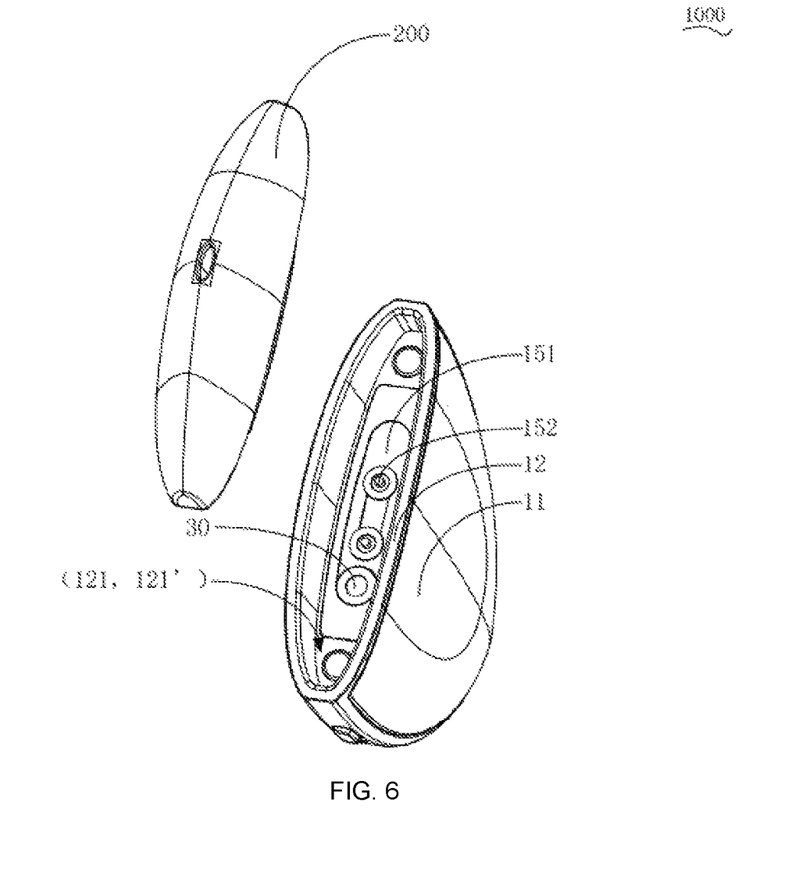
FIG. 6 is an exploded schematic diagram illustrating a connecting structure of an electronic cigarette according to the present invention.

Referring to FIG. 6, the present invention further provides an electronic cigarette 1000. The electronic cigarette 1000 comprises a heating device 200 and a power assembly 100. Refer to the above embodiment for the specific structure of the power assembly 100. Due to the use of all the technical solutions of all the above embodiments, the electronic cigarette 1000 has at least all the beneficial effects brought by the technical solutions of the above embodiments, which will not be described in detail herein.

The above are preferred embodiments of the present invention merely and are not intended to limit the patent scope of protection of the present invention. Any equivalent structures made according to the description and the accompanying drawings of the present invention without departing from the idea of the present invention, or any equivalent structures applied in other relevant technical fields directly or indirectly are intended to be included in the patent scope of protection of the present invention.

What is claimed is:

1. A power assembly, comprising:
a main body,
a waterproof and breathable membrane, and
a pneumatic sensor, wherein the main body is provided with an internal cavity in which the pneumatic sensor is mounted and a mounting portion in which an external load is mounted, the mounting portion is provided with an airflow passage, the internal cavity is in communication with external environment through the airflow passage, the waterproof and breathable membrane is mounted on the main body and covers the airflow passage; when the external load is mounted on the mounting portion, air from inside the external load is communicated with the airflow passage, and when the pneumatic sensor senses that an airflow movement in the airflow passage reaches a preset threshold, the main body is triggered to control the external load,
wherein the main body is provided with a mounting groove in which the waterproof and breathable membrane is mounted, wherein the mounting groove is provided with a notch plane, and the waterproof and breathable membrane has a thickness value H greater than or equal to the depth value h of the mounting groove such that when the waterproof and breathable membrane is mounted to the mounting groove, the waterproof and breathable membrane is exposed to an external surface, which is level with the notch plane of the mounting groove or higher than the notch plane of the mounting groove.

2. The power assembly according to claim 1, wherein the waterproof and breathable membrane is mounted to an end of the airflow passage away from the internal cavity.

3. The power assembly according to claim 2, wherein the waterproof and breathable membrane comprises a substrate having a waterproof and breathable property and an anti-wrinkle ring, wherein the anti-wrinkle ring covers the edge of the substrate such that when the substrate is mounted to the main body, the portion of the substrate that is not covered by the anti-wrinkle ring covers the airflow passage and forms a breathable portion, and the breathable portion is communicated with the airflow passage through an air channel.

4. The power assembly according to claim 2, wherein the main body comprises a housing, a frame and a sealing member; one end of the frame is provided with the mounting portion, and the other end of the frame and the housing encircles a receiving space for receiving electronic components; the sealing member comprises a cover portion and an air guiding portion connected to the cover portion, the cover portion is mounted in the receiving space and is provided with the internal cavity, and the air guiding portion is engaged in the airflow passage so that the airflow passage is in communication with the internal cavity.

5. An electronic cigarette comprising an external load, wherein the electronic cigarette further comprises the power assembly according to claim 2, wherein the external load is a heating device in which tobacco liquid or a tobacco product is stored.

6. The power assembly according to claim 1, wherein the waterproof and breathable membrane comprises a substrate having a waterproof and breathable property and an anti-wrinkle ring, wherein the anti-wrinkle ring covers the edge of the substrate such that when the substrate is mounted to the main body, the portion of the substrate that is not covered by the anti-wrinkle ring covers the airflow passage and forms a breathable portion, and the breathable portion is communicated with the airflow passage.

7. The power assembly according to claim 6, wherein the waterproof and breathable membrane further comprises an adhesive layer, the adhesive layer is provided on the surface of the substrate away from the anti-wrinkle ring so that the substrate is adhered to the main body, and the adhesive layer is provided to avoid the breathable portion of the substrate; and/or, the substrate has a thickness in a range from 0.02 mm to 0.11 mm.

8. An electronic cigarette comprising an external load, wherein the electronic cigarette further comprises the power assembly according to claim 7, wherein the external load is a heating device in which tobacco liquid or a tobacco product is stored.

9. An electronic cigarette comprising an external load, wherein the electronic cigarette further comprises the power assembly according to claim 6, wherein the external load is a heating device in which tobacco liquid or a tobacco product is stored.

10. The power assembly according to claim 1, wherein the main body comprises a housing, a frame and a sealing member; one end of the frame is provided with the mounting portion, and the other end of the frame and the housing encircles a receiving space for receiving electronic components; the sealing member comprises a cover portion and an air guiding portion connected to the cover portion, the cover portion is mounted in the receiving space and is provided with the internal cavity, and the air guiding portion is engaged in the airflow passage so that the airflow passage is in communication with the internal cavity.

11. The power assembly according to claim 10, wherein the air guiding portion is provided with at least one air vent, and an outer circumferential surface of the air guiding portion is abutted against the inner circumferential surface of the airflow passage such that the airflow moves from the internal cavity and the airflow passage only through the air vent.

12. An electronic cigarette comprising an external load, wherein the electronic cigarette further comprises the power assembly according to claim 11, wherein the external load is a heating device in which tobacco liquid or a tobacco product is stored.

13. The power assembly according to claim 10, wherein the frame is provided with a mounting pocket to form the mounting portion, the inner wall of the mounting pocket is provided with the airflow passage, and the external load is engaged into the mounting pocket and is spaced apart from the inner wall of the mounting pocket for the airflow passage being in communication with an external environment.

14. An electronic cigarette comprising an external load, wherein the electronic cigarette further comprises the power assembly according to claim 10, wherein the external load is a heating device in which tobacco liquid or a tobacco product is stored.

15. An electronic cigarette comprising an external load, wherein the electronic cigarette further comprises the power assembly according to claim 1, wherein the external load is a heating device in which tobacco liquid or a tobacco product is stored.

* * * * *